United States Patent [19]

Moulin

[11] Patent Number: 5,563,514
[45] Date of Patent: Oct. 8, 1996

[54] METHOD AND APPARATUS FOR DETERMINING FORMATION RESISTIVITY IN A CASED WELL USING THREE ELECTRODES ARRANGED IN A WHEATSTONE BRIDGE

[75] Inventor: Pierre A. Moulin, Chaville, France

[73] Assignee: Schlumberger Technology Corporation, Ridgefield, Conn.

[21] Appl. No.: 220,081

[22] Filed: Mar. 30, 1994

[30] Foreign Application Priority Data

Mar. 31, 1993 [FR] France .................. 93-03755

[51] Int. Cl.$^6$ .................................................. G01V 3/20
[52] U.S. Cl. ......................................................... 324/368
[58] Field of Search .................................. 324/368, 347, 324/351, 352, 355, 357, 358

[56] References Cited

U.S. PATENT DOCUMENTS

| | | | |
|---|---|---|---|
| Re. 21,832 | 6/1941 | Huber | 324/355 |
| 2,459,196 | 1/1949 | Stewart | 175/182 |
| 2,729,784 | 1/1956 | Fearon | 324/1 |
| 2,891,215 | 6/1959 | Fearon | 324/1 |
| 4,431,963 | 2/1984 | Walkow | 324/65 R |
| 4,431,964 | 2/1984 | Walkow | 324/65 R |
| 4,748,415 | 5/1988 | Vail, III | 324/339 |
| 4,794,322 | 12/1988 | Davies | 324/65 CR |
| 4,796,186 | 1/1989 | Kaufman | 364/422 |
| 4,820,989 | 4/1989 | Vail, III | 324/368 |
| 4,837,518 | 6/1989 | Gard et al. | 324/368 |
| 4,857,831 | 8/1989 | Davies et al. | 324/65 CR |
| 4,882,542 | 11/1989 | Vail, III | 324/368 |
| 5,038,107 | 8/1991 | Gianzero et al. | 324/339 |
| 5,043,668 | 8/1991 | Vail, III | 324/368 |
| 5,043,669 | 8/1991 | Vail, III | 324/368 |
| 5,075,626 | 12/1991 | Vail, III | 324/368 |
| 5,187,440 | 2/1993 | Vail, III | 324/368 |
| 5,223,794 | 6/1993 | Vail, III | 324/368 |
| 5,260,661 | 11/1993 | Vail, III | 324/339 |

FOREIGN PATENT DOCUMENTS

| | | |
|---|---|---|
| 2207278 | 6/1974 | France . |
| 266090 | 7/1970 | U.S.S.R. . |

OTHER PUBLICATIONS

Russian paper of Mademov, entitled, "Effectiveness of Resistivity Logging of Cased Wells by a Six–Electrode Device", IZV VYSSH. Ucheb Zavedenii, NEFT GAZ No. 7, Jul. 1987, pp. 11–15.

Paper by Schenkel et al. entitled "Numerical Study on Measuring Electrical Resistivity through Casing in a Layered Medium", Expanded Abstracts, Society of Exploration Geophysicists (SEG, for the 60th Annual Meeting and Exposition, held San Francisco, CA, Sep. 23–27, 1990., pp. 538–541.

*Primary Examiner*—Walter E. Snow
*Attorney, Agent, or Firm*—Leonard W. Pojunas; Martin Hyden

[57] ABSTRACT

The invention relates to a method of determining the resistivity of a geological formation through which a metal-cased borehole passes, by means of at least three electrodes in contact with the casing and spaced apart in the longitudinal direction of the borehole. In order to eliminate the effect of any differences between the two sections of casing delimited by the electrodes, a circuit connected to the electrodes and forming a Wheatstone bridge is balanced, with said sections of casing constituting two of the resistances in said Wheatstone bridge circuit.

35 Claims, 4 Drawing Sheets

FIG_1
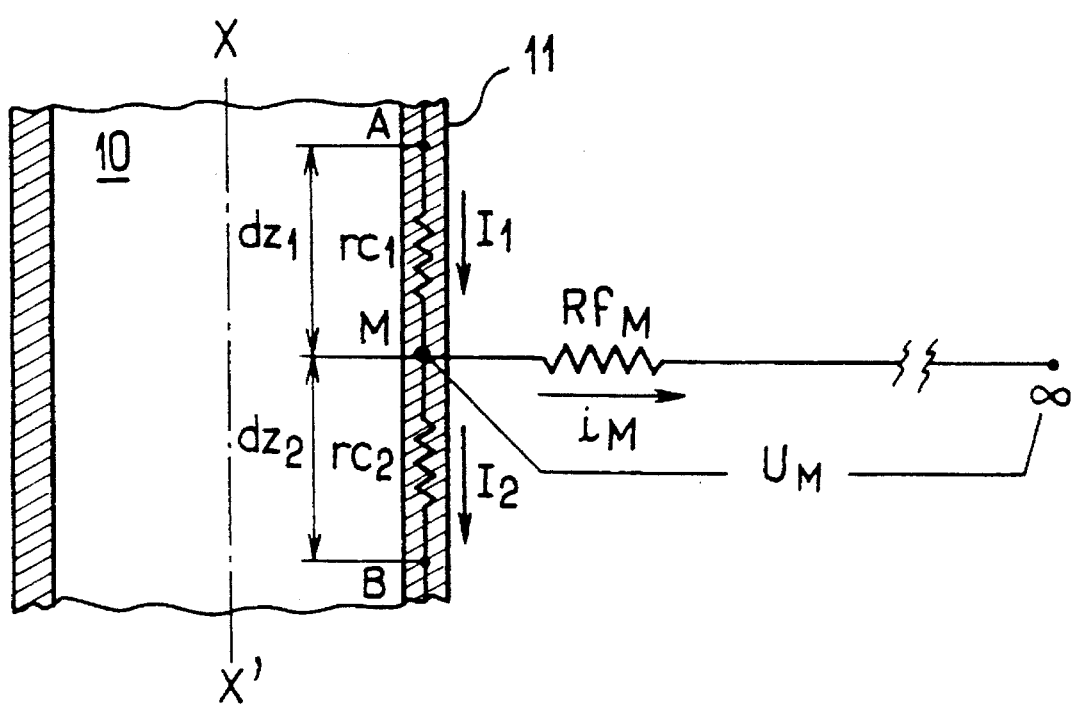

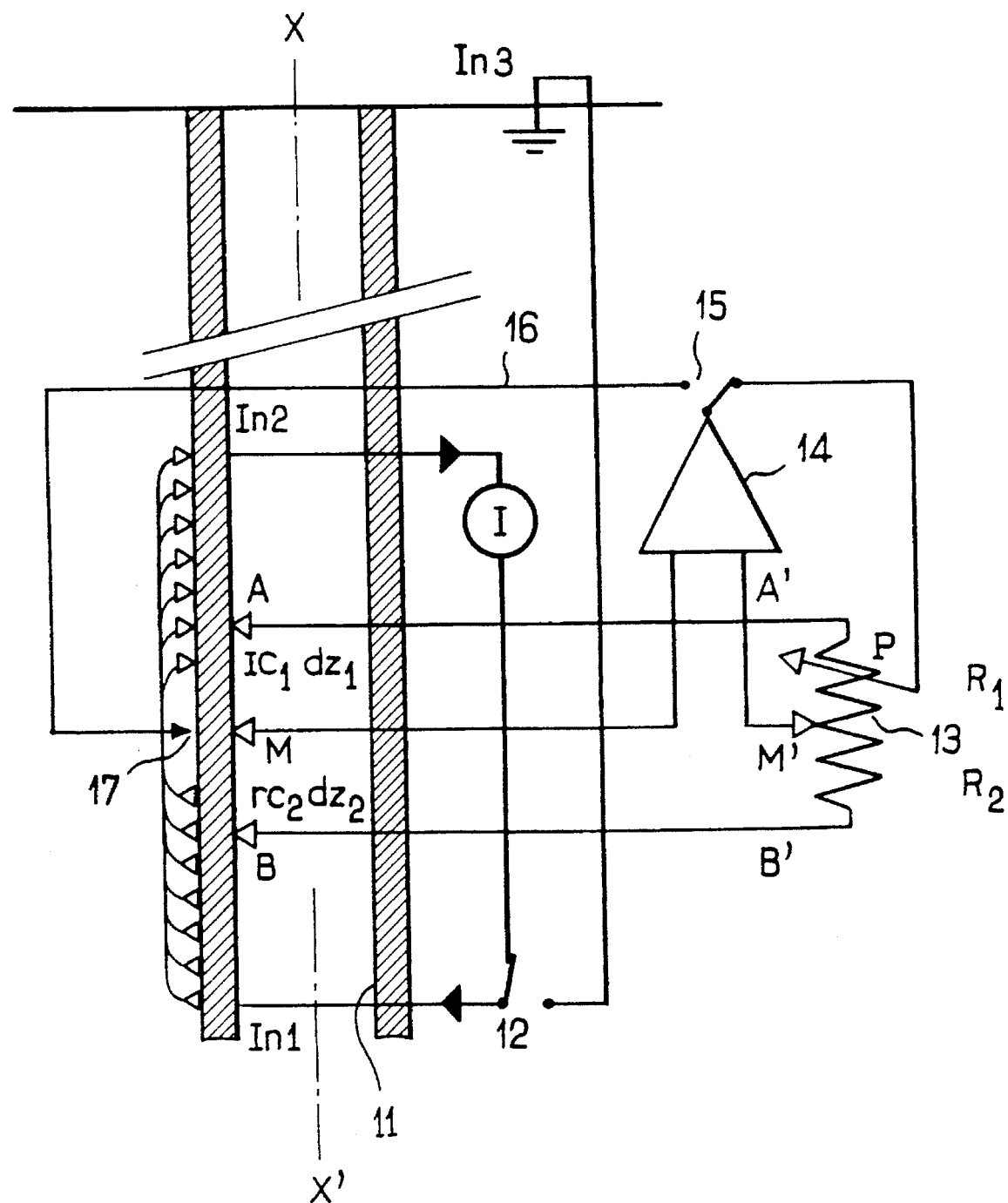
FIG_2a

METHOD AND APPARATUS FOR DETERMINING FORMATION RESISTIVITY IN A CASED WELL USING THREE ELECTRODES ARRANGED IN A WHEATSTONE BRIDGE

The invention relates to determining the resistivity of the geological formations through which a metal-cased well passes.

There is no longer any need to demonstrate the importance of resistivity logs in oil prospecting. It is known that the resistivity of a formation depends essentially on the fluid it contains: a formation containing brine. i.e. a conductive liquid, has much lower resistivity than a hydrocarbon-bearing formation, and consequently resistivity measurements are invaluable for locating hydrocarbon deposits. Resistivity logs have been in widespread use for a long time, and they have been made, in particular, by means of devices having electrodes. However existing techniques are suitable for use only in wells that are not cased ("open hole" wells in oil jargon). The presence in a well of metal casing whose resistivity is tiny compared with typical values for geological formations (about $2.10^{-7}$ ohm.m for steel casing as compared with 1 to 1,000 ohm.m for a formation) constitutes a major impediment when it comes to applying electrical currents to the formations surrounding the casing. One particular result of this is that it is essential to perform resistivity measurements before installing the casing. In particular, it is not possible to obtain resistivity measurements for wells that are in production, since such wells are cased.

It would therefore be most advantageous to be able to measure the resistivity of sections of cased wells. Such a measurement performed at the level of the pay zone in a well would make it possible to locate the interfaces between water and hydrocarbon, and therefore to track changes over time in the positions of such interfaces, for The purpose of monitoring the behavior of the hydrocarbon reservoir and optimizing exploitation thereof. It would also be possible to obtain a measure of the resistivity in a well (or a section of a well) in which no measurement had been performed before the casing was installed, thereby making it possible to obtain further information about the reservoir, and possibly to detect productive layers that were not located initially.

Proposals on this topic exist in the literature. As described in U.S. Pat. No. 2,459,196 (Stewart, assigned to Sun Oil Company), the basic principle of the measurement consists in causing a current to flow along the casing under conditions such that current leaks or is lost to the formation. The amount of loss is a function of the resistivity of the formation—the greater The conductivity of the formation the greater the loss—and so the resistivity of the formation can be determined by measuring the loss. The current loss can be evaluated by measuring the voltage drop between electrodes placed at different depths down the well.

U.S. Pat. No. 2,729,784 (Fearon, assigned to Lane Wells Company) describes a measurement method that uses two measurement electrodes spaced apart along the casing, plus a third measurement electrode placed between said two electrodes to indicate or to measure current leakage into the formation. Current electrodes are placed on either side of the measurement electrodes to inject currents in opposite directions into the casing. A feedback loop servo-controls current injection so as to put The two measurement electrodes mentioned above at the same potential for the purpose of eliminating the effect of variations in the resistance of the casing in the sections spanned by the measurement electrodes. A value is obtained for the leakage current level with the central electrode by measuring the voltage drop across each pair constituted by the central electrode and one of the external electrodes, and by taking the difference between the voltage drops, with said difference being said to be proportional to the leakage current.

U.S. Pat. No. 2,891,215 (Fearon, assigned to Electro Chemical Laboratories) emphasizes that the method of above-mentioned U.S. Pat. No. 2,729,784 by the same inventor is too sensitive to variations in the characteristics of the casing (thickness, electrical properties). This leads to a difference due to one of said characteristics differing between two sections of casing, e.g. differing in thickness, being interpreted as a meaningful change in the resistivity of the formation, and in particular a change indicative of an interface. To eliminate such errors, U.S. Pat. No. 2,891,215 proposes placing an additional current electrode level with the central measurement electrode, but at a different angular position, and servo-controlling the current injected by said additional electrode by means of a second feedback loop for the purpose of exactly compensating the leakage current, thereby enabling the leakage current to be measured directly.

French patent 2 207 278 (Institut francais du Petrole, inventors Desbrandes and Mangez) provides for the use of three measurement electrodes that are regularly spaced apart as in U.S. Pat. Nos. 2,729,784 and 2,891,215 for the purpose of measuring current leakage, and it describes a two-step method: a first step for measuring the resistance of the section of casing delimited by the external measurement electrodes, during which step current is caused to flow along the casing in such a manner that there is no leakage into the formation; and a second step during which current may leak into the formation. To this end, a current injection system is provided comprising an emission electrode and two return electrodes, one close to the measurement electrodes and active during the first step, and the other situated on the surface and active during the second step. That patent also specifies that the measurements performed in the first step may provide indications concerning the state of corrosion of the casing.

U.S. Pat. No. 4,796,186 (Kaufman, assigned to Oil Well Logging) describes a two-step method of the same type as above-mentioned French patent 2 207 278, and it uses the same disposition of electrodes. It provides a circuit for eliminating the effect of variations in resistance between two sections of casing, which circuit includes amplifiers connected to each pair of measurement electrodes in such a manner as to provide respective voltage drop outputs. One of the amplifiers is a variable gain amplifier and its gain is adjusted during the first step so as to cancel the difference between the outputs from the amplifiers. That patent also mentions a possible application of the measurements obtained to investigating casing corrosion.

U.S. Pat. No. 4,820,989 (Vail, assigned to Paramagnetic Logging) describes a compensation technique identical to that of U.S. Pat. No. 4,796,186.

U.S. Pat. No. 4,837,518 (Gard, Kingman and Klein, assigned to Atlantic Richfield) describes a measurement method that uses a device which is continuously displaced along the well, and which alternates between measuring the resistivity of the casing and the resistivity of the formation.

Finally, mention should be made of the techniques implemented for evaluating casing corrosion, which techniques are available as a commercial service (e.g. the CPET service provided by Schlumberger). Investigation of casing corrosion is based, like measurement of resistivity, on the existence of a leakage current into the formation, which current can be attributed to electrochemical potential, and on the measurement of the resistance of each section of casing that is to be evaluated. On this topic, reference may be made to U.S. Pat. Nos. 4,431,963 and 4,431,964 (Walkow, assigned to Dresser Industries), and more particularly to U.S. Pat. Nos. 4,794,322 and 4,857,831 (Davies and Takeda, assigned to Schlumberger).

In a first aspect, an object of the present invention is to provide a resistivity measuring method making use of at least three electrodes that are spaced apart along the borehole and in which the influence of lengthwise variations in the resistance of the casing are eliminated in a manner that is simple and effective.

In another aspect, an object of the invention is to measure formation resistivity from a cased well with accuracy and with satisfactory vertical resolution.

The present invention provides a method of determining the resistivity of a geological formation having a metal-cased borehole passing therethrough, the method using at least three electrodes in contact with the casing and spaced apart in the longitudinal direction of the borehole, the method being characterized by the fact that in order to eliminate the effect of differences between the two sections of casing delimited by the electrodes, a circuit connected to the electrodes and forming a Wheatstone bridge is balanced, with said sections of casing forming parts of the Wheatstone bridge circuit.

In a preferred implementation, a current is applied in a first step in such a manner as to flow only through the casing, and the bridge is balanced, after which, in a second step, a current is applied in such a manner as to enable current leakage to take place into the formation, and the resistivity of the formation is determined by using the bridge unbalance due to the leakage current.

Advantageously, the bridge is balanced in the second step by applying an additional current to the middle electrode. This current is preferably applied at a point that is angularly spaced apart from the middle electrode.

The invention will be well understood on reading the following description given with reference to the accompanying drawings. In the drawings:

FIG. 1 shows the principle on which resistivity measurement in a cased well is based:

FIGS. 2a and 2b are diagrams showing the method of the invention in a preferred implementation:

Figure 2B:
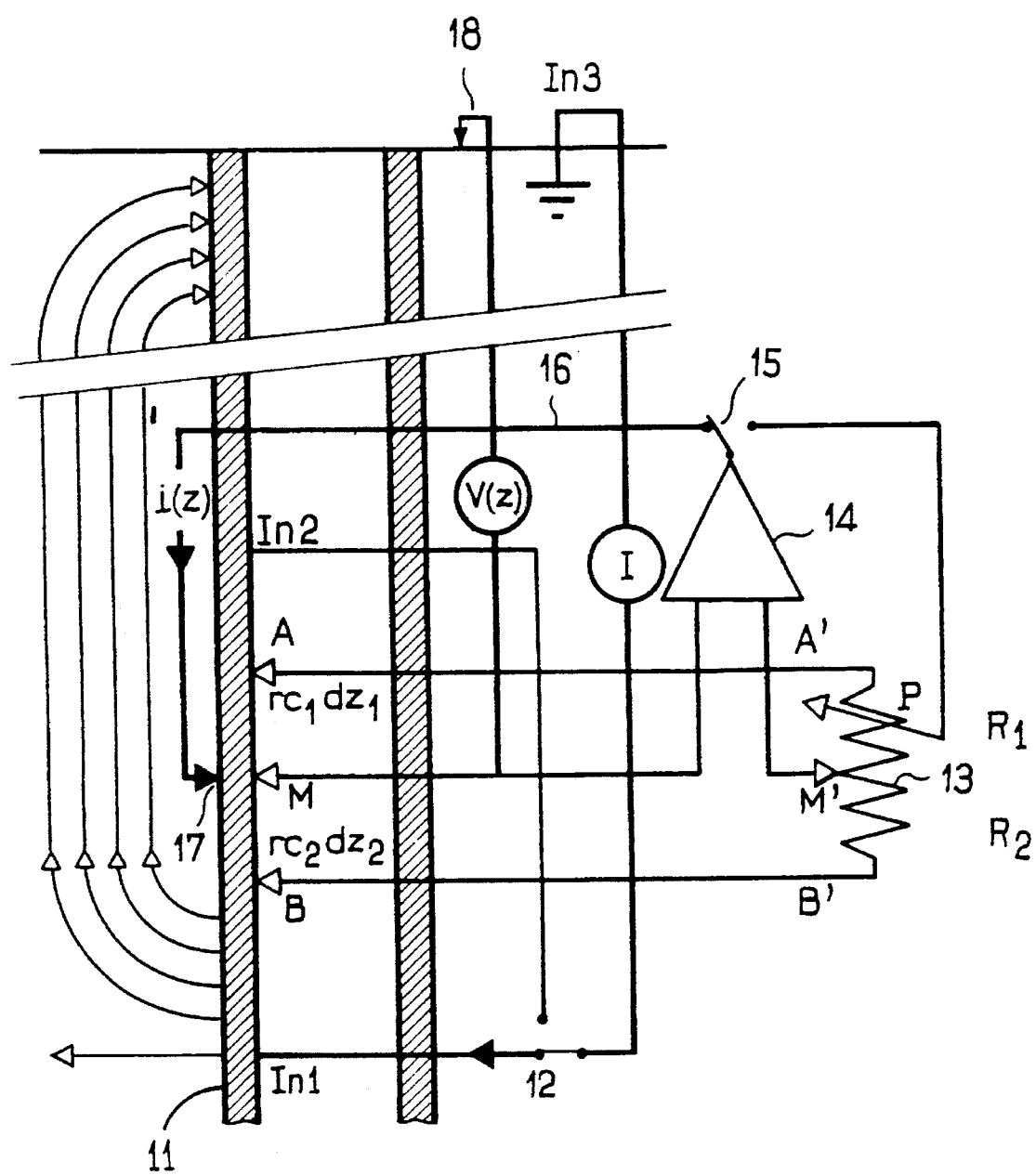
Figure 3A:
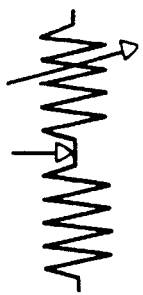
Figure 3B:
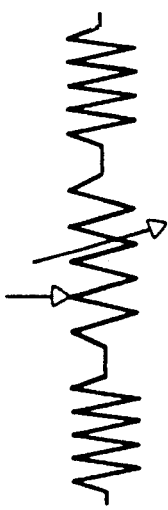
Figure 3C:
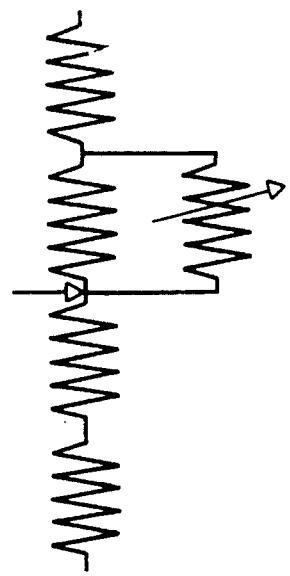
Figure 3D:
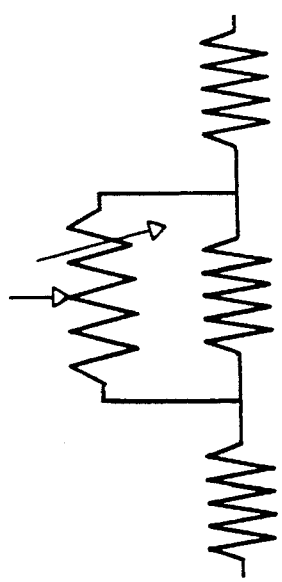
Figure 4:
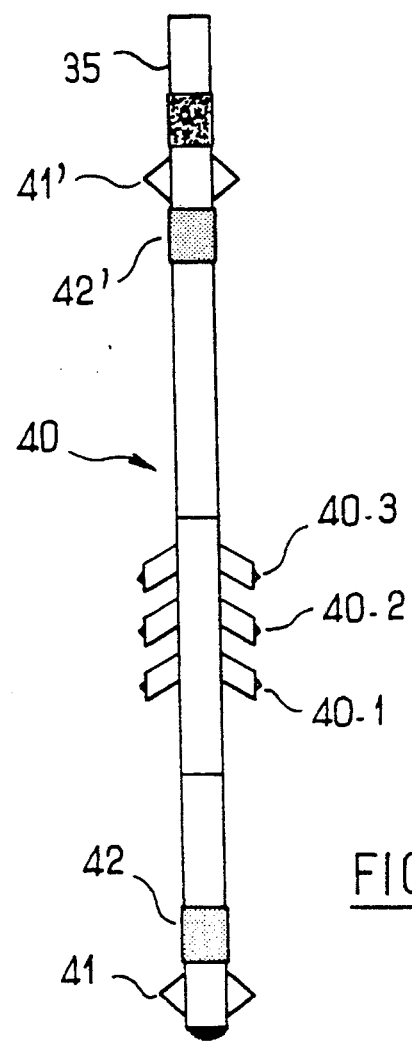

FIGS. 3a, 3b, 3c, and 3d show particular implementations of the potentiometer shown in FIGS. 2a and 2b: and FIG. 4 is a diagram of a device suitable for use in implementing the invention.

The principle on which measuring the resistivity in a cased well is based consists in causing a current to flow along the casing with a distant return, so as to enable current to leak into the geological formations through which the well passes, and in evaluating the leakage current: at a given level, the greater the conductivity of the formation surrounding the veil at said level, the greater the leakage current. In mathematical terms, this is expressed by a decreasing exponential relationship for current flowing in the casing, with a rate of decrease at a given level that is a function of the ratio between the conductivity of the formation and the conductivity of the casing.

The diagram of FIG. 1 represents a section of well 10 about an axis X-X' and provided with metal casing 11. The level (or depth) at which a measurement is to be performed is referenced M. A section of casing extending on either side of the level M is taken into consideration. If a current flows in the casing with a distant return (e.g. on the surface), the loss of current to the formation gives rise, in electrical circuit diagram terms, to a shunt resistance placed between the level M of the casing and infinity. The resistance $Rf_M$ of said shunt is representative of the resistivity of the formation at the level M. Using Ohm's law the following can be written:

$$Rf_M = k \cdot U_M / i_M \quad (1)$$

where k is a geometrical constant that may be determined by calibration measurements, $U_M$ is the potential difference measured at level M relative to infinity, and $i_M$ is the leakage current at level M.

Furthermore, by using a discrete representation for the purposes of simplification, it is possible to describe the loss of current at level M as a difference Between the current entering level M and the current leaving it. The leakage current $i_M$ can thus be defined as the difference between the assumed constant currents $I_1$ and $I_2$ that flow respectively in section AM and in section MB of the casing:

$$i_M = I_1 - I_2 \quad (2)$$

or $$i_M = V_1/rc_1 \cdot dz_1 - V_2/rc_2 \cdot dz_2 \quad (2')$$

where $V_1$ and $V_2$ designate the potential differences respectively along section AM and along section MB of the casing, where $rc_1$ and $rc_2$ represent the resistance per unit length in each of the sections AM and MB respectively of the casing, and $dz_1$ and $dz_2$ represent the lengths of the sections AM and MB, respectively.

Given the ratio between the resistivity of the casing and the usual resistivity values of formations, which ratio lies in the range $10^7$ to $10^{10}$ the loss of current along a length corresponding to acceptable resolution for measuring the resistivity of a formation, e.g. 30 cm to 1 m, is minimal. The difference between the voltage drops $V_1$ and $V_2$ that can be attributed to current loss is therefore normally a quantity that is very small. As a result, any uncertainties, even if very small, affecting the terms of the difference, give rise to a major effect. Such uncertainties exist both with respect to the resistances $rc_1$ and $rc_2$, and with respect to the lengths $dz_1$ and $dz_2$: for various reasons (local corrosion, non-uniformity in casing material, variation in width), the actual values of $rc_1$ and $rc_2$ may differ from the value that corresponds to the nominal characteristics of the casing, and may above all be different from each other. Uncertainty also exists on the values of the lengths $dz_1$ and $dz_2$ since the measurement sections AM and MB are delimited by measurement electrodes that are put into contact with the casing, and there inevitably remains uncertainty on the positions of the contact points A, M, and B.

A preferred implementation of the invention is described below with reference to FIGS. 2a and 2b.

In the diagrams of FIGS. 2a and 2b, the same references are used as in FIG. 1, namely a well 10 about an axis X-X' fitted with casing 11, and three measurement electrodes A, M, and B spaced apart at distances $dz_1$ (AM) and $dz_2$ (MB) that are preferably substantially equal, and that are of the order of 40 cm to 80 cm. for example. The electrodes A, M, and B form portions of a device referred to below as the "downhole" device, which is designed to be lowered down a well on the end of a cable, but which is not shown in FIGS. 2a and 2b for reasons of clarity. An example of such a downhole device is described below with reference to FIG. 4.

Current electrodes are also provided of forming two different current-applying circuits.

A first circuit comprises electrodes In1 and In2 put in contact with the casing and disposed on opposite sides of the electrodes A and B, at distances therefrom that are of the same order of magnitude as the distance between the electrodes A and B. The electrodes In1 and In2 form parts of the downhole device.

The second circuit comprises the above-mentioned electrode In1 in contact with the casing and a remote electrode In3 that is preferably placed on the surface at a certain distance from the well head. A switching circuit 12 is controllable from the surface and serves to put either the first circuit or the second circuit into operation.

A zero loop circuit is also connected to the electrodes A, M, and B. This circuit comprises firstly a circuit 13 referred to below as a "potentiometer" and constituted by two resistances having respective values $R_1$ (section A'M+) and $R_2$ (section M'B'), and whose terminals A' and B' are connected to the measurement electrodes A and B respectively. The zero loop circuit also includes a subtracter circuit 14 shown in the form of an amplifier having one input connected to the point M' where the resistances $R_1$ and $R_2$ of the circuits 13 are connected together, an another input connected to the central measurement electrode M. The output of the subtracter circuit 14 is connected to the adjustment point P of the potentiometer in such a manner as to enable it to be set to a value which gives a null value at the output from the subtracter circuit 14. It may be observed that the potentiometer 13 is connected to the measurement electrodes A, M, and B in such a manner that the resistances $R_1$ and $R_2$ form with the sections of casing AM and MB spanned by the pairs of electrodes A & M and M & B a Wheatstone bridge. The bridge is in balance when the potential difference between the electrode M and the junction point M' on the resistances of the potentiometer is zero. At equilibrium, the ratio between the resistances $R_1$ and $R_2$ is equal to the ratio between the resistances respectively of the section AM and of the section MB of the casing. This gives rise to the following equilibrium relationship, which makes use of the same symbols as above:

$$R_1/R_2 = rc_1.dz_1/rc_2.dz_2 \qquad (3)$$

In addition, a switching circuit 15 is provided connected between the output of the subtracter circuit 14 and the potentiometer 13, and an additional current circuit 16 is provided connected to the output of the subtracter circuit 14 via the switching circuit 15. The additional circuit comprises firstly a current electrode 17 placed in contact with the casing substantially the same level as the central electrode M. In FIGS. 2a and 2b, the electrode 17 is shown as being placed outside the casing, but that is merely a symbolic representation for the purposes of clarity. In practice, the electrode 17 is part of the downhole device and is naturally inside the casing. It makes contact with the casing at a zone which is at substantially at the same level as the central electrode M as mentioned above, but which is separate therefrom, e.g. being offset in azimuth, so that the application of current does not run the risk of disturbing measurement.

The embodiment described above is designed for performing a measurement in two steps, as illustrated in FIGS. 2a and 2b respectively.

The first step is intended to characterize measurement conditions in situ, and more particularly to determine the characteristics of the casing over the section AB, and the characteristics of the measurement system formed by the measurement electrodes A, B, and M as applied to the casing 11.

In this step, a current (preferably a low frequency alternating current, e.g. at a frequency of 1 Hz to 5 Hz) is applied to the casing by means of the first current-applying circuit comprising the electrodes In1 and In2, by placing the switching circuit 12 in its appropriate position. In this way, current hardly penetrates into the formation surrounding the well. Furthermore, the switching circuit 15 is put in its position where the output from the subtracter circuit 14 is connected to the adjustment point of the potentiometer 13, and the Wheatstone bridge is brought into balance as described above.

The second step is for measuring the resistivity of the formation level with the electrode M. The switching circuit 12 is put into its position where the active circuit is the second current-applying circuit constituted by the electrode In1 and the distant electrode In3, with the applied current being of the same type as in the first step, i.e. an alternating current at the same frequency. Under such conditions, current leakage occurs as described above with reference to FIG. 1, which leakage is a function of the resistivity of the formation at the level of electrode M.

This current leakage tends to unbalance the Wheatstone bridge formed by the resistance $R_1$ and $R_2$ of the potentiometer 13 and the sections of casing AM and MB. This unbalance effect is compensated by connecting the output of the subtracter circuit 14 of the zero loop to the additional current circuit 16 By means of the switching circuit 15 being put in its appropriate position. In this way, the magnitude i(z) of the current flowing through the circuit 16 is constrained to take the value corresponding to balance in the Wheatstone bridge, i.e. to cause a zero potential difference to occur between the electrode M and the point M' of the potentiometer. This current magnitude i(z) that compensates the effect of current leakage is equal to the leakage current referred to above by the notation $i_M$ (ignoring any possible scale factor).

This technique thus makes it possible to measure the leakage current directly. To determine the formation resistivity $Rf_M$, the potential difference $U_M$ at M is also measured using the distant electrode as the reference potential, which electrode may be placed on the surface (reference 18 in FIG. 2b), or is preferably situated inside the well. e.g. on the insulated portion of the cable (known as the "bridle") connecting the downhole device to the cable. The ratio $U_M/i_M$ is determined in application of the above-mentioned equation (1), and the formation resistivity $Rf_M$ is deduced from said ratio.

The person skilled in the art is capable of selecting a potentiometer having the required properties for performing the above-described method with the desired high resolution and good stability. Various possibilities are shown in FIGS. 3a to 3d. FIG. 3a shows a circuit comprising a fixed resistance and an adjustable resistance in series therewith. FIG. 3b shows a circuit comprising an adjustable resistance connected in series between two fixed resistances. FIG. 3c shows a circuit comprising a fixed portion and an adjustable portion itself comprising an adjustable resistance connected in parallel across the terminals of a fixed resistance. FIG. 3d shows a circuit comprising three fixed resistances connected in series and having an adjustable resistance connected in parallel across the terminals of the middle fixed resistance.

FIG. 4 is a diagram of a downhole device suitable for use in implementing the invention. In conventional manner, this device is suspended in operation from an electric cable (not shown) and it includes an interface unit 35 providing an interface with the cable.

The central portion 40 of the device which performs the functions allocated to the measurement electrodes A, M, and B and to the current electrode 17, as described above, is similar to the apparatus in commercial use by Schlumberger for its CPET service, which apparatus is described in detail in above-mentioned U.S. Pat. Nos. 4,794,322 and 4,857,831.

The CPET service is intended to evaluate cathodic protection of casing and the corrosion state of casing, and it comprises twelve measurement electrodes distributed over four levels that are spaced apart in the longitudinal direction, with the distance between levels being about 60 cm, and the three electrodes in each level being symmetrically disposed about the axis of the apparatus, i.e. they are spaced apart by angles of 120° between adjacent electrodes. The electrodes are carried on pivoting arms subjected to the action of springs for extending them, and a hydraulic device enables the arms to be returned to a retracted position. Each electrode includes a contact element adapted to provide good electrical contact with the casing.

For the present invention, it has been shown that three measurement levels suffice, and FIG. 4 shows measurement electrodes 40-1, 40-2, and 40-3 on three levels. However it is possible to use a larger number of levels, e.g. five levels forming two groups of three consecutive levels, thereby making it possible to acquire a greater amount of information and to perform measurements corresponding to two different depths simultaneously. Under such circumstances, each set of three consecutive electrodes is associated with the circuits described with reference to FIGS. 2a and 2b.

In the present invention, it suffices to have a single electrode per level. The electrode must be associated with a device that ensures good contact between the electrode and the casing. Such devices are well known to the person skilled in the art and there is no point in giving a detailed description thereof. With reference to the current electrode 17, it is mentioned above that it must be separate from the central electrode M. This may be achieved in various different ways. For example, the electrode M and the electrode 17 could both be placed on the same side of the apparatus, and at a small distance apart in The longitudinal or circumferential direction.

The device also includes elements 41 and 41' that act as current electrodes and that are situated on either side of the central portion 40, with the distance between the elements 41 and 41' being several meters, e.g. about 5 m. Insulating connectors 42 and 42' such as AH169 type connectors commonly used by Schlumberger are placed between the central portion 40 and the elements 41 and 41'. The elements 41 and 41' may be made like conventional centralizers for cased wells. The wheels normally provided on such centralizers for making contact with the casing are then replaced by elements that act as current electrodes, and electrical conductors are provided for making connections with said electrode-forming elements.

The invention is not limited to the embodiment described above. For example, the current could be applied during the first step in such a manner that current flow does not take place only in the casing, but takes place also in a zone surrounding the casing, which zone is normally cemented. The Wheatstone bridge would then be balanced on the basis of the characteristics not only of the casing but also of the zone immediately adjacent the casing. Consequently, compensation for influence on the measurements performed during the second step would then be provided relative to the assembly constituted by the casing and the essentially cemented adjacent zone. The resulting resistivity measurements could then be considered as being more characteristic of the geological formations proper. Such a result could be obtained by placing the current electrodes In1 and In2 at a greater distance than that specified above.

I claim:

1. A method of determining the resistivity of a geological formation having a metal-cased borehole passing therethrough by means of at least three electrodes in contact with the casing and spaced apart in the longitudinal direction of the borehole, comprising the steps of providing a circuit forming a Wheatstone bridge and connected to said three electrodes in such a manner that the two sections of casing delimited by said electrodes constitute two of the resistances of the bridge, and balancing said bridge circuit so as to eliminate the effect of differences between said two sections of casing.

2. A method of determining the resistivity of a geological formation through which a metal-cased borehole passes, in which at least three electrodes spaced apart in the borehole direction are placed in contact with the casing at the level of said formation, comprising the steps of connecting said electrodes to a circuit forming a Wheatstone bridge with the two sections of casing delimited by the electrodes, applying a current in a first step in such a manner as to flow substantially only through the casing and balancing the bridge, applying a current in a second step in such a manner as to enable current leakage to take place into the formation, and determining the resistivity of the formation by using the bridge unbalance due to the leakage current.

3. A method according to claim 2, in which said bridge is balanced in said second step by applying an additional current to the casing substantially at the level of the middle electrode.

4. A method according to claim 3, in which, in the second step, the voltage at the middle electrode and the additional current are measured and the ratio of said voltage divided by said current is formed, said ratio being representative of the resistivity of the formation.

5. A method according to claim 3, in which said additional current is applied at a point which is distinct from the middle electrode.

6. A method of determining the resistivity of a geological formation through which a metal-cased borehole passes, in which at least three electrodes spaced apart in the borehole direction are placed in contact with the casing level with said formation, comprising the steps of connecting the electrodes to a circuit forming a Wheatstone bridge with the two sections of casing delimited by the electrodes, applying a current in a first step in such a manner as to flow substantially only through the casing and a zone immediately adjacent to the casing, balancing the bridge, applying in a second step a current in such a manner as to enable current leakage to take place into the formation, and determining the resistivity of the formation by using the bridge unbalance due to the leakage of current.

7. Apparatus for determining the resistivity of a geological formation through which a metal-cased borehole passes, the apparatus comprising at least three electrodes in contact with the casing and spaced apart in the longitudinal direction of the borehole, the apparatus further including a circuit connected to the electrodes and arranged to form a Wheatstone bridge in which the sections of casing delimited by said electrodes constitute two of the resistances.

8. Apparatus according to claim 6, including a zero loop circuit suitable for acting to bring the Wheatstone bridge to balance.

9. Apparatus according to claim 7, including a circuit for applying current to the casing substantially level with the middle electrode, which circuit is responsive to the zero loop circuit to compensate an unbalance of the Wheatstone bridge.

10. A method according to claim 4, in which said additional current is applied at a point which is distinct from the middle electrode.

11. A method of characterizing an underground formation surrounding a cased borehole, comprising:
   a) placing three measurement electrodes in contact with the casing in a special relationship;
   b) connecting the measurement electrodes so as to form a Wheatstone bridge which is balanced to compensate for variations in resistivity of the casing between the measurement electrodes;
   c) applying a current to the casing;
   d) determining the current leaking from the casing into the formation using the balanced Wheatstone bridge; and
   e) characterizing the formation on the basis of the leakage current.

12. A method as claimed in claim 11, wherein the Wheatstone bridge is balanced by providing a feedback system which responds to differences in the resistivity of the casing between the measurement electrodes when a current is applied to the casing so as to adjust the resistance of a resistor forming part of the Wheatstone bridge until it is balanced.

13. A method as claimed in claim 11, wherein the Wheatstone bridge is used to apply a current to the casing which corresponds to the leakage current, the applied current being measured to determine the leakage current.

14. A method as claimed in claim 11, wherein a current is caused to flow through the casing only in the region of the measurement electrodes while the Wheatstone bridge is balanced.

15. A method as claimed in claim 11, wherein a current is caused to flow from the region of the measurement electrodes to a remote return electrode while determining the leakage current.

16. A method as claimed in claim 13, wherein the leakage current is used to determine the resistivity of the formation.

17. A method as claimed in claim 16, further comprising measuring voltage at one of the electrodes and using the measured voltage in the determination of resistivity.

18. A method as claimed in claim 17, where the electrodes are spaced along a longitudinal axis of the casing, the applied current being applied, and the voltage measured, at the level of the middle one of the electrodes.

19. A method as claimed in claim 11, wherein the electrodes are spaced apart in the longitudinal direction of the borehole, the electrodes being connected in such a manner that the two sections of casing delimited by the electrodes constitute two resistances of the Wheatstone bridge, and the Wheatstone bridge being balanced so as to eliminate the effect of differences between the two sections of casing.

20. A method as claimed in claim 11, comprising applying current in a first step in such a manner as to flow substantially only through the casing and balancing the Wheatstone bridge, and applying a current in a second step in such a manner as to enable current leakage to take place into the formation, and determining the resistivity of the formation by using the Wheatstone bridge unbalance due to leakage current.

21. A method as claimed in claim 20, wherein the Wheatstone bridge is balanced in the second step by applying an additional current to the casing substantially at the level of the middle electrode.

22. A method as claimed in claim 21, wherein, in the second step, the voltage at the middle electrode and the additional current are measured and the ratio of the voltage divided by the additional current is formed, the ratio being representative of the resistivity of the formation.

23. A method as claimed in claim 21, wherein the additional current is applied at a point which is distinct from the middle electrode.

24. A method as claimed in claim 22 wherein the additional current is applied at a point which is distinct from the middle electrode.

25. Apparatus for measuring the resistivity of an underground formation surrounding a cased borehole, comprising:
   a) three measurement electrodes for contacting the casing in a spaced relationship, the measurement electrodes being connected so as to form a Wheatstone bridge which is balanced to compensate for variations in resistivity of the casing between the measurement electrodes;
   c) means for applying a current to the casing;
   d) means for determining the current leaking from the casing into the formation using the balanced Wheatstone bridge.

26. Apparatus as claimed in claim 25, further comprising a feedback system which responds to differences in the resistivity of the casing between the measurement electrodes when a current is applied to the casing so as to adjust the resistance of a resistor forming part of the Wheatstone bridge until it is balanced.

27. Apparatus as claimed in claim 25, wherein the Wheatstone bridge is used to apply a current to the casing which corresponds to the leakage current, and further comprising means for measuring the applied current to determine the leakage current.

28. Apparatus as claimed in claim 25, comprising means for causing a current to flow through the casing only in the region of the measurement electrodes while the Wheatstone bridge is balanced.

29. Apparatus as claimed in claim 25, further comprising a remote return electrode, current being caused to flow from the region of the measurement electrodes to the return electrode while determining the leakage current.

30. Apparatus as claimed in claim 27, comprising means for determining the resistivity of the formation from the determination of the leakage current.

31. Apparatus as claimed in claim 30, further comprising means for measuring voltage at one of the electrodes.

32. Apparatus as claimed in claim 31, wherein the electrodes are spaced along a longitudinal axis of the casing and the applied current is applied and the voltage measured at the level of the middle one of the electrodes.

33. Apparatus as claimed in claim 25, wherein the electrodes are spaced apart in the longitudinal direction of the borehole, a circuit being connected to the electrodes to form the Wheatstone bridge in which the sections of the csaing delimited by the electrodes consitute two of the resistances.

34. Apparatus as claimed in claim 33, further comprising a zero loop circuit suitable for acting to bring the Wheatstone bridge to balance.

35. Apparatus as claimed in claim 34, further comprising a circuit for applying a current to the casing substantially level with the middle electrode, which circuit is responsive to the zero loop circuit to compensate an unbalance of the Wheatstone bridge.

* * * * *